United States Patent [19]
Waddill et al.

[11] Patent Number: 5,093,458
[45] Date of Patent: Mar. 3, 1992

[54] 4-METHYL-2-MORPHOLINONE AS A CURATIVE FOR EPOXY RESIN COMPOSITIONS

[75] Inventors: Harold G. Waddill; Wei-Yang Su, both of Austin, Tex.

[73] Assignee: Texaco Chemical Company, White Plains, N.Y.

[21] Appl. No.: 628,558

[22] Filed: Dec. 17, 1990

[51] Int. Cl.$^5$ .................... C08G 59/40; C08G 65/00
[52] U.S. Cl. .................................. 528/94; 528/113; 528/118; 528/120
[58] Field of Search .................... 528/94, 118

[56] References Cited

U.S. PATENT DOCUMENTS

| | | | |
|---|---|---|---|
| 3,621,018 | 11/1971 | Hindersinn et al. | 528/118 |
| 3,660,388 | 5/1972 | Dazzi | 528/118 |
| 3,759,914 | 9/1973 | Simms et al. | 528/118 |

*Primary Examiner*—Maurice J. Welsh
*Assistant Examiner*—Frederick Krass
*Attorney, Agent, or Firm*—Jack H. Park; Kenneth R. Priem

[57] ABSTRACT

4-Methyl-2-morpholinone is an excellent catalytic curing agent for epoxy resins. The compound is also an accelerator when combined with standard epoxy resin curing agents.

6 Claims, No Drawings

4-METHYL-2-MORPHOLINONE AS A CURATIVE FOR EPOXY RESIN COMPOSITIONS

BACKGROUND OF THE INVENTION

This invention is related to the preparation of epoxy resin compositions cured by 4-Methyl-2-morpholinone.

SUMMARY OF THE INVENTION

The invention is an epoxy resin composition comprising a vicinal polyepoxide having an epoxide equivalency of greater than about 1.8 and a curing amount of 4-Methyl-2-morpholinone. The invention is also a method of curing an epoxy resin comprising a vicinal polyepoxide comprising mixing a vicinal polyepoxide having an epoxide equivalency of greater than about 1.8 with a curing amount of 4-Methyl-2-morpholinone.

The invention is also an epoxy resin composition and a method for curing an epoxy resin wherein 4-Methyl-2-morpholinone is added to an epoxy resin which is being cured by a conventional reactive epoxy resin curing agent.

DESCRIPTION OF THE PREFERRED EMBODIMENTS

An improved epoxy formulation has been developed which is resistant to heat and chemicals. The formulation uses polyepoxide cured with 4-Methyl-2-morpholinone. 4-Methyl-2-morpholinone also has been found to accelerate the cure of epoxy resins when combined with known curatives such as anhydrides or dicyandiamide (DICY).

The vicinal polyepoxides which are cured with 4-Methyl-2-morpholinone are aromatic organic materials having an average of at least 1.8 reactive 1,2-epoxy groups per molecule. These polyepoxide materials can be monomeric or polymeric, monoaromatic or heterocyclic, and may be substituted if desired with other substituents besides the epoxy groups, e.g., hydroxyl groups, ether radicals, aromatic halogen atoms and the like. These vicinal polyepoxide containing compounds typically are of an epoxy equivalent weight (EEW) of 150 to 250. Preferably the base resin, which has an epoxide equivalent weight of from 175 to 195, is derived from condensing epichlorohydrin with 4,4'-isopropylidenediphenol or 2,2-bis(p-hydroxyphenyl)propane to form 2,2-bis(p-2,3 epoxy propoxyphenyl)propane, a derivative of Bisphenol A.

Preferred polyepoxides are those of glycidyl ethers prepared by epoxidizing the corresponding allyl ethers or reacting, by known procedures, a molar excess of epichlorohydrin and an aromatic polyhydroxy compound, i.e., isopropylidene bisphenol, novolac, resorcinol, etc. The epoxy derivatives of methylene or isopropylidene bisphenols are especially preferred.

A widely used class of polyepoxides which are useful according to the instant invention includes the resinous epoxy polyethers obtained by reacting an epihalohydrin, such as epichlorohydrin, with either a polyhydric phenol or a polyhydric alcohol. Typically the epoxy resins have an average of at least 1.8 reactive, 1,2-epoxy groups per molecule. An illustrative, but by no means exhaustive, listing of suitable dihydric phenols includes 4,4'-isopropylidene bisphenol, 2,4'-5 dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones, e.g., methylhydroquinone, and the like.

Among the polyhydric alcohols which can be co-reacted with epihalohydrin to provide these resinous epoxy polyethers are such compounds as ethylene glycol, propylene glycols, butylene glycols, pentane diols, 2,2-bis(4-hydroxycyclohexyl)propane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2', 3,3'-tetrahydroxydipropylsulfide and the like, mercapto alcohols such as monothioglycerol, dithioglycerol and the like, polyhydric alcohol partial esters, such as monostearin, pentaerythritol monoacetate and the like, and halogenated polyhydric alcohols such as the monochlorohydrins of glycerol, sorbitol, pentaerythritol and the like.

Another class of polymeric polyepoxides useful in accordance with the present invention includes the epoxy novolac resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolac resins can be obtained in H. Lee, and K. Neville, *Handbook of Epoxy Resins*, McGraw Hill Book Co., New York, 1967.

It will be appreciated by those skilled in the art that the vicinal polyepoxy compounds which are useful according to the practice of the present invention are not limited to those containing the above-described polyepoxides, but that these polyepoxides are to be considered merely as being representative of the class of vicinal polyepoxides as a whole.

4-Methyl-2-morpholinone is the curative found useful in this invention. 4-Methyl-2-morpholinone may be used as the sole curing agent. When combined with other well known curing systems and agents, such as anhydrides or dicyandiamide (DICY), 4-Methyl-2-morpholinone provides an accelerating effect as the following examples will show.

Conventional curative agents are usually added to the formulation in a stoichiometric amount, i.e., in an amount so that there is one reactive hydrogen atom present in the curing component for each epoxy group in the epoxy resin component. However, the curing agent of the present invention differs in that it posseses no reactive hydrogen atoms but functions instead as a catalytic curative. Reactivity results from the unshared electron pair of the fully substituted nitrogen atom. Since the activity is catalytic in nature, only small amounts of curative are needed. The amount of curative required for development of maximum properties can only be determined by routine experimentation by methods known to those skilled in the art since the structure of each tertiary amine determines its reactivity and subsequent curing ability. For the product of the invention the amount required to develop optimum properties was about 9 phr. Small and larger amounts of curative had a deterimental effect on cured resin properties.

EXAMPLE 1

Properties: 4-Methyl-2-Morpholinone as an Epoxy Resin Curative

| Formulation: | |
|---|---|
| Liquid Epoxy resin (EEW 185-192) | 100 pbw |
| 4-Methyl-2-morpholinone | 9 pbw |
| Gel time, mins. | 6657-29C |
| @80° | 419.6 |
| 120° | 28.6 |
| 150° C. | 26.7 |
| Pot life, hrs. to double viscosity @23° C. (100 g. mass) | ~44 |
| Properties of Cured ⅛ inch | 6657-43A |
| Castings cured: 4 hrs. 100°, 4 hrs. 150° C. | |
| Shore D hardness, 0-10 sec | 89-87 |
| HDT, °C., 264 psi | 82.8 |
| Izod impact strength, ft-lb/in | 0.12 |
| Tensile strength, psi | 10500 |
| Tensile modulus, psi | 457000 |
| Elongation at break, % | 3.6 |
| Flexural strength, psi | 18700 |
| Flexural modulus, psi | 449000 |
| % wt. gain: | |
| 24-hr. water boil | 16.2 |
| 3-hr. acetone boil | 23.1 |
| Compression strength, psi | |
| at yield | 15100 |
| at failure | 36300 |
| % compression | |
| at yield | 10.8 |
| at failure | 61.4 |

EXAMPLE 2

Properties: 4-Methyl-2-Morpholineone as An accelerator of Epoxy.Anhydride Cured Systems

| Formulation: | 6657-82 | 6501-79D | 6501-94B | 6501-94D | 6657-41B |
|---|---|---|---|---|---|
| Liquid epoxy resin (EEW 185-192) | 100 | 100 | 100 | 100 | 100 |
| NADIC methyl anhydride | 85 | 85 | 85 | 85 | 85 |
| 4-Methyl-2-morpholinone | — | 2 | 4 | 6 | 8 |
| Gel time, mins. | | | | | |
| @80° | — | 227.7 | 135.4 | 102.0 | 78.0 |
| 120° C. | >500 | 39.2 | 31.7 | 27.6 | 19.3 |
| 150° C. | >500 | 39.0 | 21.3 | 15.8 | 13.0 |
| Pot life, hrs. to double viscosity @23° C. (100 g mass) | >380 | ~16-20 | ~8 | ~6-7 | 3-4 |
| Properties of Cured ⅛ inch Castings cured: 4 hrs 80°, 4 hrs. 150° C. | 1) | | | | |
| Shore D hardness, 0-10 sec | — | 87-85 | 90-89 | 88-86 | 89-88 |
| HDT, °264 psi | — | 65.5 | 114.7 | 124.0 | 120.2 |
| Izod impact strength, ft-lb/in | — | 0.11 | 0.08 | 0.11 | 0.13 |
| Tensile strength, psi | — | 7800 | 9400 | 7650 | 7000 |
| Tensile modulus, psi | — | 579000 | 540000 | 519000 | 481000 |
| Elongation at break, % | — | 1.5 | 2.0 | 1.6 | 1.6 |
| Flexural strength, psi | — | 16400 | 16400 | 18100 | 16500 |
| Flexural modulus, psi | — | 540000 | 489000 | 482000 | 471000 |
| % wt. gain | | | | | |
| 24-hr water boil | — | 3.7 | 1.6 | 1.3 | 1.9 |
| 3-hr acetone boil | — | 14.0 | 5.6 | 4.5 | 5.7 |
| Adhesion Properties Cured: 80°, 4 hrs 150° C. | 1) | | | | |
| Tensile shear strength, psi | — | 1700 | 1200 | 2500 | 1100 |
| T-peel strength, pli | — | 2.5 | 2.5 | 2.9 | 3.1 |

1)Did not cure; remained liquid after cure cycle.

EXAMPLE 3

Properties: 4-Methyl-2-Morpholinone as an Accelerator of Epoxy.DICY[1] Cured Systems

| Formulation: | 6501-27A | 6657-25A | 6657-25C | 6501-94D |
|---|---|---|---|---|
| Liquid epoxy resin (EEW 185-192) | 100 | 100 | 100 | 100 |
| DICY[1] | 4 | 4 | 4 | 4 |
| 4-Methyl-2-morpholinone | — | 2 | 4 | 6 |
| Suspending Agent[2] | — | 1 | 1 | 1 |
| Gel time, mins. | | | | |
| @ 80° | >1500 | 957.5 | 443.1 | 166.8 |
| 120° C. | >1500 | 35.2 | 27.7 | 24.7 |
| 150° C. | 33.0 | 13.8 | 11.4 | 12.2 |
| Pot life, hrs. to double viscosity @23° C. (100 g mass) | >172 | 75 | ~44 | ~28 |
| Properties of Cured ⅛ inch Castings cured: 4 hrs 80°, 4 hrs. 150° C. | 3) | | | |
| Shore D hardness, 0-10 sec | | 89-86 | 88-86 | 85-84 |
| HDT, °C. 264 psi | | 100.5 | 110.8 | 104.5 |

-continued

| Formulation: | 6501-27A | 6657-25A | 6657-25C | 6501-94D |
|---|---|---|---|---|
| Izod impact strength, ft-lb/in | | 0.10 | 0.09 | 0.05 |
| Tensile strength, psi | | 7550 | 8800 | 6300 |
| Tensile modulus, psi | | 534000 | 464000 | 529000 |
| Elongation at break, % | | 1.6 | 2.2 | 1.3 |
| Flexural strength, psi | | 16600 | 17500 | 11200 |
| Flexural modulus, psi | | 460000 | 459000 | 471000 |
| % wt. gain | | | | |
| 24-hr water boil | | 4.6 | 4.7 | 5.6 |
| 3-hr acetone boil | | 6.9 | 5.7 | 6.3 |

[1] DICY = Dicyandiamide; Cyanoguandine
[2] Cab-o-Sil; Cabot Chemical Co.
[3] Curative (DICY) separated; non-homogeneous, incomplete reaction; no properties were determined.

We claim:

1. An epoxy resin composition comprising the cured reaction product of:
   (A) a vicinal polyepoxide having an average of at least 1.8 reactive, 1,2-epoxy groups per molecule and
   (B) a curing amount of 4-Methyl-2-morpholinone.

2. A method for curing an epoxy resin comprising a vicinal polyepoxide having an average of at least 1.8 reactive, 1,2-epoxy groups per molecule comprising mixing 4-Methyl-2-morpholinone with said polyepoxide in an amount effective for curing the polyepoxide.

3. An epoxy resin composition comprising the cured reaction product of:
   (A) a vicinal polyepoxide having an average of at least 1.8 reactive, 1,2-epoxy groups per molecule and
   (B) a curing amount of an anhydride and
   (C) an amount of 4-Methyl-2-morpholinone sufficient to accelerate the curing of the polyepoxide compared with the polyepoxide cured with the anhydride alone.

4. A method for curing an epoxy resin comprising a vicinal polepoxide having an average of at least 1.8 reactive, 1,2-epoxy groups per molecule comprising mixing a curing amount of an anhydride with said polyepoxide in an amount effective for curing the polyepoxide and also mixing with the polyepoxide and anhydride an amount of 4-Methyl-2-morpholinone sufficient to accelerate the curing of the polyepoxide compared with the polyepoxide cured with the anhydride alone.

5. An epoxy resin composition comprising the cured reaction product of:
   (A) a vicinal polyepoxide having an average of at least 1.8 reactive, 1,2-epoxy groups per molecule and
   (B) a curing amount of dicyandiamide and
   (C) an amount of 4-Methyl-2-morpholinone sufficient to accelerate the curing of the polyepoxide compared with the polyepoxide cured with the dicyandiamide alone.

6. A method for curing an epoxy resin comprising a vicinal polepoxide having an average of at least 1.8 reactive, 1,2-epoxy groups per molecule comprising mixing a curing amount of a dicyandiamide with said polyepoxide in an amount effective for curing the polyepoxide and also mixing with the polyepoxide and dicyandiamide an amount of 4-Methyl-2-morpholinone sufficient to accelerate the curing of the polepoxide compared with the polyepoxide cured with the dicyandiamide alone.

* * * * *